UNITED STATES PATENT OFFICE.

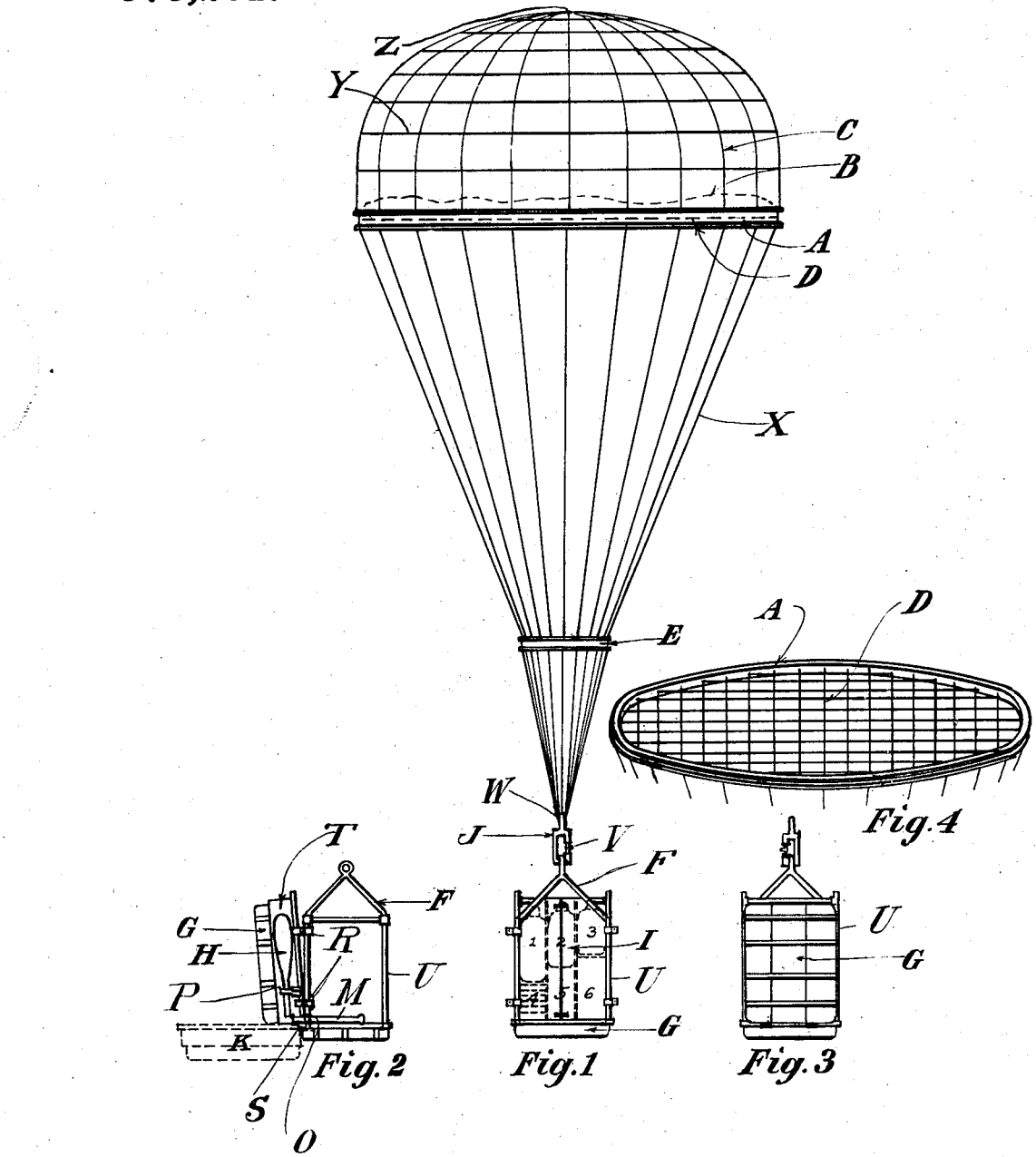

JOHN J. RECTENWALD, OF MOUNT OLIVER BOROUGH, PENNSYLVANIA.

LIFE-SAVING DEVICE.

975,281.      Specification of Letters Patent.      Patented Nov. 8, 1910.

Application filed April 29, 1910. Serial No. 558,387.

*To all whom it may concern:*

Be it known that I, JOHN J. RECTENWALD, a citizen of the United States of America, residing at Mount Oliver borough, in the county of Allegheny and State of Pennsylvania, have invented certain new and useful Improvements in Life-Saving Devices, of which the following is a specification, reference being had therein to the accompanying drawing.

This invention relates to a life saving device designed for use in aeronautics, the device being applicable to dirigible balloons and other air crafts.

The primary object of my invention is to provide a life saving device in the form of a parachute that can be easily carried by an air craft and released to safely land the occupants of the air craft.

Another object of the invention is to provide a parachute life saving device with novel means whereby the occupants of an air craft can safely land upon the water and propel themselves to land or keep afloat until rescued.

A further object of this invention is to provide a parachute with a detachable cage adapted to support a floating medium and provide sufficient room for provisions, whereby when the parachute is carried to sea, the cage can be easily detached and the occupants of the cage remain afloat with provisions until rescued.

I attain the above objects by a device that will be hereinafter more fully described and then claimed, and reference will now be had to the drawing forming a part of this specification, wherein there is illustrated a preferred embodiment of the invention, but it is to be understood that the structural elements thereof can be varied or changed, as to the size, shape and manner of assemblage without departing from the scope of the invention.

In the drawing:—Figure 1 is a front elevation of a life saving device, Fig. 2 is a side elevation of a detached cage forming part of the device, Fig. 3 is a rear elevation of the cage, and Fig. 4 is a perspective view of the main parachute frame.

In the accompanying drawing the reference character A denotes a channel shaped metallic ring, preferably made of aluminum or similar light and durable material. Suitably connected to the ring A is a wire mesh or netting D adapted to support a bag B when the same is deflated or collapsed, the bag B having the edges thereof suitably connected to the ring A. To reinforce the bag B when the same is inflated and prevent the same from bursting, I attach ropes C to the ring A, these ropes being connected at a central point, as at Z, also by circumferentially arranged ropes Y.

Connected to the ring A are a plurality of converging supporting cables X having the lower ends thereof passing through a small aluminum ring E, and the lower ends of the cables are attached to the eyelet W of a snap-hook J, said snap-hook being of a conventional form as commonly used in connection with harness and having a spring pressed latch V. Connected to the snap-hook J is the stirrup F of a metallic cage U, said cage being preferably made of drawn aluminum tubing, although hickory or other light and durable material can be advantageously used. The cage U is adapted to support the occupants of the parachute and is adapted to contain provisions I, the various packages of provisions or other supplies being designated by the numerals 1 to 6 inclusive.

Suitably attached to the bottom of the cage U are pieces of cork G adapted to retain the cage afloat on water when detached from the parachute through the medium of the snap-hook J.

Hinged or otherwise connected at one side of the cage U is an aluminum casing T provided with a cork bottom $G^2$. The aluminum casing is hinged, as at S and said casing in an open position is represented by dotted lines designated K. With the casing T in a folded position, it is engaged by clasps R carried by the cage U.

Suitably connected to the sides of the casing T by a clasp P is a folding canoe paddle H, the paddle being made in two hinged sections, with the handle section M connected to the cage, as at O.

The parachute with the bag B thereof deflated is adapted to be carried by a dirigible balloon and should the balloon be disabled or an elevation reached that is dangerous to the occupants of the balloon, they can repair to the cage of the parachute, cut the same loose and descend. The casing T, paddle H and the cork G and G² are provided for fear the occupants of the cage should land upon water.

Having now described my invention what I claim as new, is:—

1. A life saving device comprising a cage adapted to be detachably connected to a parachute, a buoyant body at the bottom of said cage, a casing hinged to said cage and foldable thereagainst, a buoyant body carried by the bottom of said casing, and propelling means for the cage connected with the casing and the cage.

2. A life saving device comprising a cage adapted to be detachably connected to a parachute, a buoyant body at the bottom of said cage, a casing hinged to said cage and foldable thereagainst, a buoyant body carried by the bottom of said casing, and a foldable propelling means for the cage carried by the latter and said casing.

In testimony whereof I affix my signature in the presence of two witnesses.

JOHN J. RECTENWALD.

Witnesses:
K. H. BUTLER,
JOHN L. STEPHANY.